United States Patent [19]
Stiller

[11] 4,396,794
[45] Aug. 2, 1983

[54] ARC PROTECTION CLAMP AND ARRANGEMENT FOR COVERED OVERHEAD POWER DISTRIBUTION LINES

[75] Inventor: Paul H. Stiller, North Huntingdon, Pa.

[73] Assignee: Westinghouse Electric Corp., Pittsburgh, Pa.

[21] Appl. No.: 248,788

[22] Filed: Mar. 30, 1981

[51] Int. Cl.[3] .......... H02H 1/04; H02H 7/00

[52] U.S. Cl. .......... 174/2; 24/135 R; 24/135 K; 24/40 R; 24/144; 24/117

[58] Field of Search .......... 174/2, 40 R, 43, 44, 174/71 R, 94 S, 127, 135, 140 R, 144; 361/1, 107, 117, 131, 132; 24/135 R, 135 K; 339/263 R, 263 L, 265 R, 265 F

[56] References Cited

U.S. PATENT DOCUMENTS 2,164,022 6/1939 Rowe .......... 339/265 R
2,868,861 1/1959 Bither .......... 174/43
2,956,104 10/1960 Bither .......... 174/44
3,046,327 7/1962 Harmon .......... 174/127 X
3,773,967 11/1973 Sturm .......... 174/127 X

FOREIGN PATENT DOCUMENTS 879234 11/1942 France .......... 174/144
1463145 11/1966 France .......... 339/265 R

*Primary Examiner*—Laramie E. Askin
*Attorney, Agent, or Firm*—John L. DeAngelis, Jr.

[57] ABSTRACT

A covered distribution wire is provided with a clamp device having sufficient mass to provide conductor protection against damage from fault current arcs over a section of the conductor where the insulation cover is removed for interconnection or insulator support purposes. The clamp comprises two members which are bolted together to surround the conductor section such that an enlarged disc-like end clamp portion is positioned about the conductor within one and a half centimeters of an end face of the adjacent wire cover. The two members are secured together such that a pair of slots exists between them along opposite sides of the conductor section with splatter barriers located on one end thereof. The slots are tapered with increasing width in the radially outward direction with the minimum width being great enough to avoid weldment and the maximum width being less than that which allows fault arc travel through the slot to the conductor section. The clamp mass is at least a minimum value needed for practicality in usage and otherwise is based on the fault energy to be absorbed from fault arcs in the expected usage.

15 Claims, 28 Drawing Figures

LOOP SYSTEM

ARC PROTECTION CLAMP AND ARRANGEMENT FOR COVERED OVERHEAD POWER DISTRIBUTION LINES

CROSS REFERENCE TO RELATED APPLICATIONS

U.S. patent application Ser. No. 248,789 entitled "Arc Protection Arrangement For Covered Overhead Power Distribution Lines" filed by D. F. Shankle et al. concurrently herewith.

BACKGROUND OF THE INVENTION

The present invention relates to arc protection for power distribution lines and more particularly to structured arrangements employed to protect covered overhead power distribution lines against damage from fault current arcing.

Electric power distribution lines are normally classed as those which operate at 34 kV or less line to line, but usually no lower than 4 kV line to line. Overhead distribution conductors are insulated from ground using stand-off or string insulators on support poles. Adequate insulation from ground is achieved without covering the conductors with an insulating material. Bare distribution conductors are in use throughout the United States.

A significant percentage of installed power distribution lines are provided with conductors having an insulation covering which reduces hazards to life and property near or close to the lines. Covered conductors also provide certain other advantages over bare conductor circuits. For example, momentary tree contact is less likely to fault a covered conductor than a bare conductor. Momentary phase-to-phase contact caused by wind deflection will fault a bare conductor circuit, while a covered conductor circuit would not be affected under the same circumstances.

Covered distribution conductors can and often do create system maintenance problems as a result of conductor damage caused by lightning induced fault currents. Thus, experience has shown that covered conductors burn down more frequently than bare conductors. A fallen overhead phase conductor can cause a high impedance fault on distribution circuits, such as when a phase conductor falls, without contacting another phase or neutral conductor, and comes to rest on an asphalt or other high impedance surface. The resulting fault current magnitude is sometimes not sufficient to cause operation of the overcurrent protection equipment. In addition to interrupting customer service, the undetected live wire is a threat to public safety and a fire hazard.

Lightning may strike an overhead distribution conductor anywhere along its length and it can and often does arc to another conductor at a weak point. The most probable arcing occurs with common vertical lines with current flowing between the top phase conductor and the neutral conductor. Some problem exists for flashover from the top conductor to another phase conductor, sometimes involving all phases and the neutral.

Lightning can initiate power frequency fault current by ionizing a small path of gas between the conductors. This often occurs where the conductors have their insulation stripped back for necessary interconnections or attachment to support insulators.

The magnitude of the power frequency fault current is a function of the line voltage, the circuit impedance and other system parameters. Secondary functions such as arc bending winds and humidity also affect the fault current magnitude.

The fault current duration depends on the speed with which circuit interrupters function to open the faulted circuit. Conductor damage at the point of arcing varies in accordance with the conductor temperatures produced by fault current heat which depends in turn on the magnitude and duration of the fault current. Often, a single arc event is sufficient to melt enough conductor metal to cause the conductor to lose its needed tensile strength. It then falls to the ground as a result of a structural failure. In other cases, it may require two or three arc faults at the same point over a period of 20 or 30 years to produce a line failure. Failure can also occur some time after damage by normal load current heating because of the reduced current carrying capability resulting from the arc damage.

When an overhead conductor in a multi-grounded neutral distribution system breaks and falls to the ground without simultaneously contacting the multi-grounded neutral conductor, there is a significant probability of it coming to rest on a high-impedance surface, such as concrete, asphalt or dry earth. As previously indicated, the resulting fault current may not be sufficient to cause operation of the overcurrent protection equipment. The problem is further aggravated by the use of covered phase conductors which may increase the fault impedance and further reduce the fault current magnitude. In addition to interrupting customer service, the undetected live wire is a threat to public safety and a fire hazard.

Clearly, if reliability and safety advantages are to be gained from the use of covered distribution lines as opposed to uncovered lines, conductor arc damage needs to be avoided where conductors are stripped of insulation for interconnection or support. Thus, covered conductors need to be protected against burndown to be more reliable and safer than comparable bare conductor circuits.

The cross-referenced application of Shankle et al. (U.S. patent application Ser. No. 248,789, filed Mar. 30, 1981) discloses a prior art arc protection clamp of simple geometry and lacking several features and advantages included in the arc protection clamp of the present invention. For example, the prior art clamp lacks features for preventing weldment of the clamp members together by the arc heat, and lacks means to prevent splatter of molten metal from the clamp onto conductor insulation during an arc protection operation. These and other advantages of the present invention will be more completely discussed below in the "DESCRIPTION OF THE PREFERRED EMBODIMENTS".

Arrangements have been employed in the past to prevent corona on power lines. Corona does not normally damage conductor metal but it does produce television and radio interference.

A representative clamp type device for corona prevention is shown in U.S. Pat. No. 3,773,967 issued to R. Sturm. Another clamp type device is shown in U.S. Pat. No. 3,046,327, issued to R. Harmon. In the '327 patent, the clamp device is bridged across a portion of the bare conductor and an adjacent conductor portion strengthened with an armor covering.

Neither this art nor other known prior art is addressed to the need for protection against fault arc burndown of covered power conductors.

SUMMARY OF THE INVENTION

A protection arrangement for covered power conductors includes a metallic clamp which engages the metallic conductor at or near the end face of the insulation covering. The clamp is preferably made of the same metal as the conductor and further is structurally featured and provided with sufficient mass to provide long term heat sink protection against arc damage as well as to provide for maintenance ease.

DESCRIPTION OF THE PREFERRED EMBODIMENTS

Figure 1A:
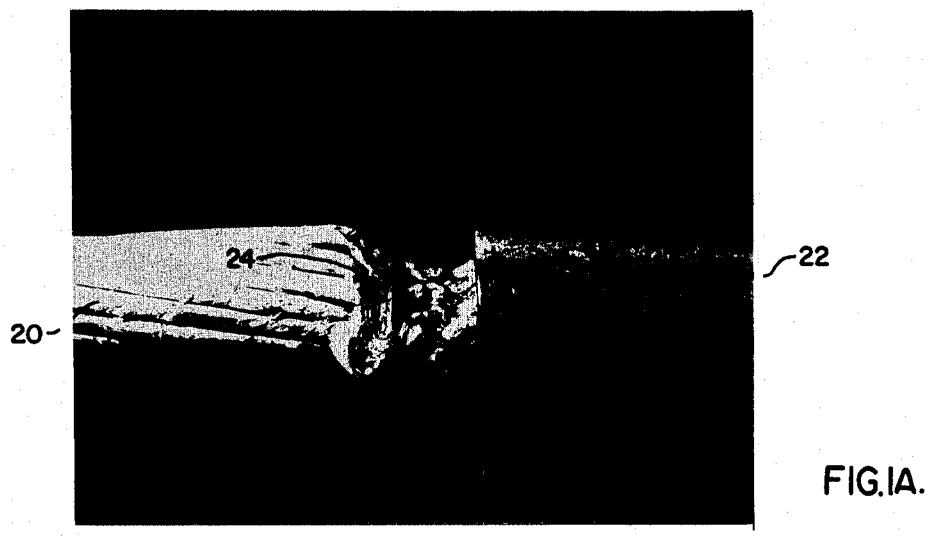
FIG. 1A shows a covered conductor having typical arc damage which can lead to a fallen line.

More particularly, there is shown in FIG. 1A a power system conductor 20 commonly manufactured from aluminum and having a polyethylene or other suitable insulation covering 22 and having a portion 24 thereof burned down as a result of the heat generated by one or more arcs produced by distribution circuit fault current. It is desirable to avoid arc damage like that at the portion 24 since conductor breakage can occur to produce a hazardous condition and a power interruption.

The basic mechanism involved in conductor burndown involves stationary arc termini which focus energy on a small portion of conductor surface. The most common conditions which can force an arc terminus to remain stationary are arc cover punctures and cover stripping provided for conductor connection or support.

Essentially all direct lightning strokes puncture the phase-conductor covering and arc to the multigrounded neutral conductor which is typically bare. The surge is more likely to cause flashover to the neutral at or near a point where it is grounded rather than at the mid-span point because of mutual coupling, which raises the neutral potential except near grounds where the neutral is held close to ground potential. Thus, the greatest phase-to-neutral potential occurs at neutral ground points.

Impulse puncture of a phase conductor and arcing to the bare neutral conductor initiates a fault on the distribution circuit. Power follow current tends to enlarge the cover puncture hole and damage the aluminum phase conductor. Typical evidence of impulse puncture and subsequent power follow current is a clean hole in the conductor covering 5 to 10 mm. in diameter, with phase conductor metal melted away. The neutral conductor shows no sign of damage as the arc moves on the neutral due to motoring action. Further, field data indicate that burndowns are frequently located near points where the neutral conductor is grounded. These indications lead to the conclusion that breakdown of the conductor cover is primarily by impulse puncture.

Cover punctures can also be caused by surface leakage current or partial discharge erosion. Since the present invention is addressed to conductor burndown, no further consideration is given to cover punctures herein.

Partial stripping is intentional and it provides access to the conductor for electrical or support connections. For example, at support insulators, a section of covering is stripped away. The bare section is then centered on the support insulator, allowing direct electrical contact between the conductor, tie wire, and insulator.

An arc terminating in the stripped region of the phase conductor motors away from the source, due to magnetic forces, and dwells at the edge of the covering. The conductor covering effectively restrains the arc terminus and focuses energy on a small portion of conductor.

After an arc is established and remains stationary, the degree of damage to the phase conductor is a function of several characteristics. The two most important are fault current magnitude and duration. Second order effects are caused by initial conductor temperature and weather changes. Damage to the conductor can include loss of original tensile strength by annealing and/or melting of conductor material, either of which can result in burndown.

The damage threshold was determined in a laboratory by applying various levels of fault current and durations to a model circuit, then assessing damage by tensile strength tests and by measuring missing conductor volume. One support pole and 20 feet of conductor were erected in the laboratory. Then a phase-to-neutral fault, at circuit-rated voltage, was initiated with thin copper wire afer energizing the circuit to rated voltage. After the thin copper wire vaporized, the resulting power arc was observed to travel away from the power source on both the phase and bare neutral conductor, due to magnetic forces, and then dwell about the phase conductor at the cover termination.

The fault current and its duration were varied to yield results for a range of fault severities, quantified by the parameter $I^2t$, where I is the symmetrical rms fault current and t is the fault duration. Fault currents from 600 to 21,000 amperes and durations from 0.017 to 2.0 seconds were investigated.

Figure 1B:
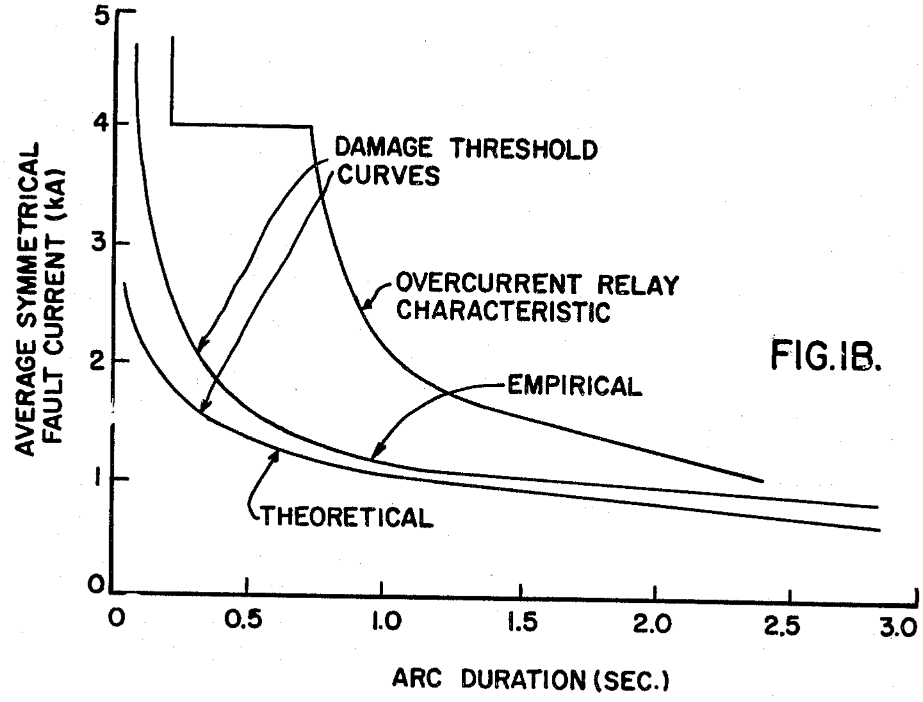
FIG. 1B shows a conductor damage threshold curve for one particular conductor size.

A photograph of typical damage is shown in FIG. 1A, and the resulting damage threshold curve is shown in FIG. 1B.

Figure 12:
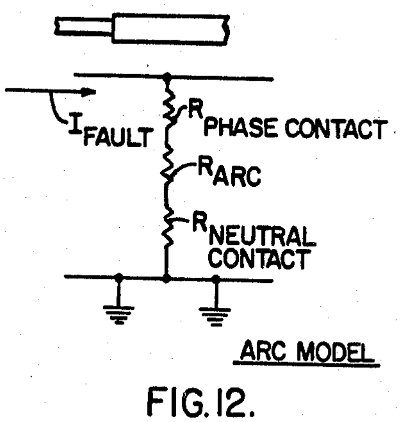
FIG. 12 shows a schematic of an arc model.

The damage threshold can be predicted theoretically by heat transfer analysis. If the arc is modeled as illustrated in FIG. 12, the energy flow from the arc to the conductor is approximated by the $I^2R$ losses of the effective contact resistance. The system becomes a mass of metal with a constant energy flux input and losses by conduction, convection and radiation. Sensible and latent heating of the conductor aluminum completes the energy balance. The theoretical damage threshold corresponds to the maximum fault current and duration without exceeding the melting point of the aluminum. The resulting characteristic is shown in FIG. 1B and is actually a semi-empirical result since the effective contact resistance values were determined from laboratory data.

An important conclusion drawn from FIG. 1B is that conventional overcurrent protection with a high continuous current rating may not prevent burndown of covered conductors. Damage may occur long before the circuit can be deenergized by conventional means.

Figure 2A:
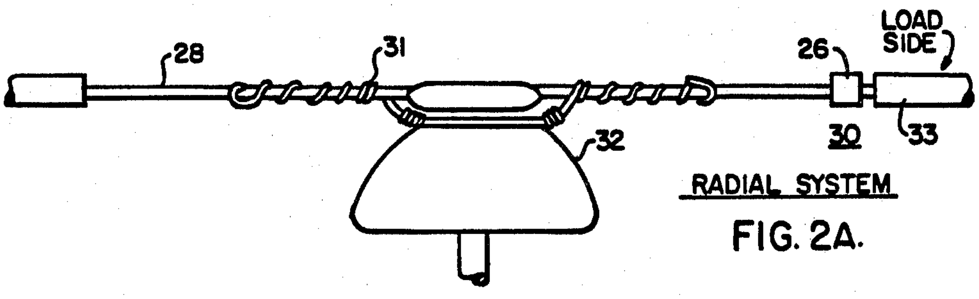
FIG. 2A shows an arrangement for protecting insulated power lines from arc damage in accordance with the principles of the invention.
Figure 4:
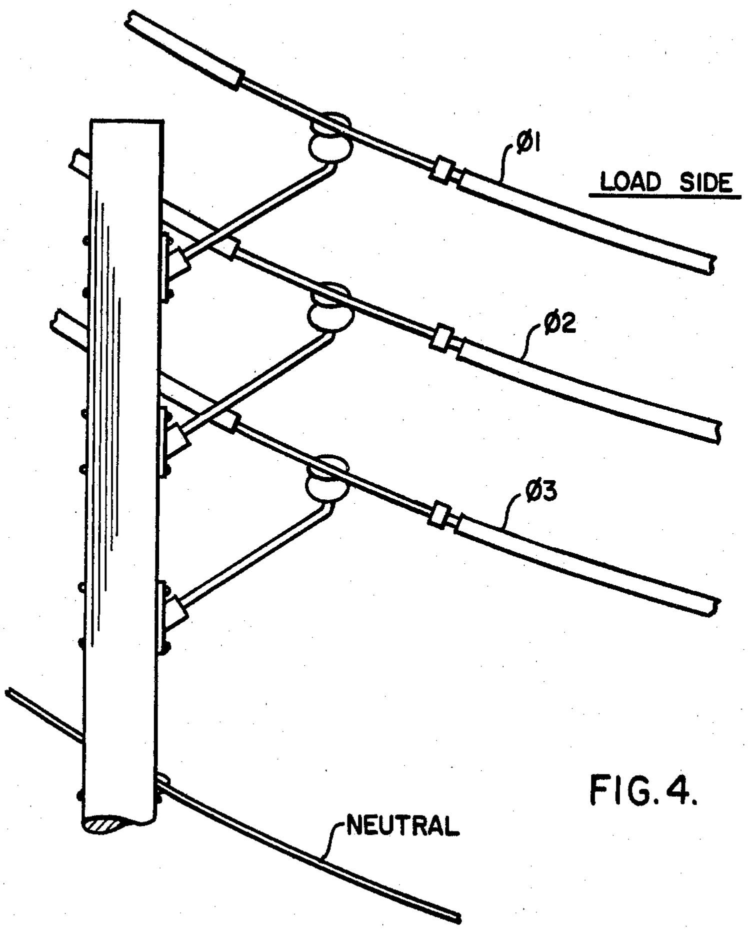
FIG. 4 shows the invention arrangement as applied to all three phases of a 3-phase distribution system.

FIG. 2A shows a typical configuration for support of single-phase distribution line 30, i.e., the phase conductor is tied by ties 31 to support insulator 32 spaced along the line length. A multi-grounded neutral conductor (not shown) is clamped to the support pole at some distance below the phase conductor. For two-phase or three-phase lines, this configuration is modified by use of a wooden crossarm or fiberglass brackets as shown in FIG. 4. As shown in FIG. 2A, when using covered conductors for overhead distribution lines, the conductor cover is stripped by some electric power companies in the vicinity of the support insulator.

Flashover of the insulator 32 due to lightning often leads to a power follow arc which travels along the stripped portion of the conductor to the insulation cover termination where it dwells. If the line-to-ground fault is not cleared in a sufficiently short period of time, the distribution conductor is damaged or severed and may fall to the ground.

Figure 2B:
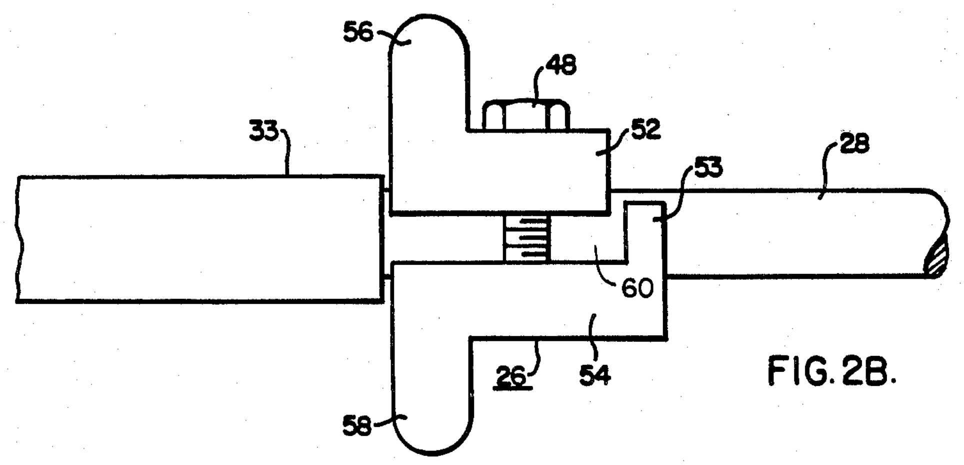
FIG. 2B shows an elevational view of an arc protection clamp included therein.

To protect against conductor arc burndown, a clamp device 26 is secured to conductor 28 near a stripped end of an insulation covering 33 as shown in FIGS. 2A and 2B. Generally, one or two clamps 26 are preferably installed at each conductor section from which insulation has been stripped. The protection provided by the clamp 26 results from its functioning as an arc terminus and a heat sink until circuit interruption devices have time to operate.

The following objectives are realized with the way in which the conductor burndown protection arrangement including the clamp is structured:

- Installation ease
- Little or no maintenance
- Impervious to weather
- Ease of service after arcing (removable)
- Durable (indefinite) electrical connection to conductor
- Eliminate loss of conductor tensile strength due to annealing or cold flow reduction in diameter as a result of arc protection functioning by the clamp.
- Prevent molten clamp metal from spattering on conductor insulator during operation.

Figure 5:
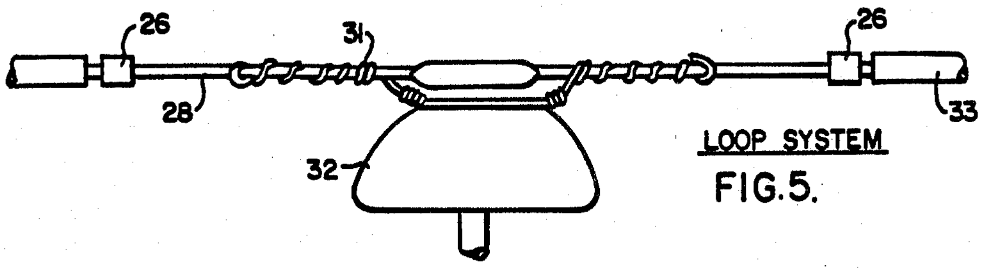
FIG. 5 shows a variation of the arrangement as applied to a loop distribution system.

The clamp 26 is a two part preferably generally cylindrical member which is structured to satisfy the described performance objectives. Because of the direction of possible arc motoring, the clamp 26 is preferably placed on the load side of the support insulator in radial distribution systems (FIG. 2A) and on both sides of the support insulation in looped distribution systems (FIG. 5).

Stripping away the cover reduces the impulse strength of the circuit at the poles and provides a highly probable lightning flashover path. Any resulting power follow arc that does not self-extinguish tends to motor away from the source and dwell on the clamp device 26. Conventional overcurrent protection equipment then clears the fault before damage occurs to the phase conductor(s).

The basic function of the clamp device 26 is to add metallic heat sink mass at the appropriate location on the distribution conductor to alter favorably the thermal response of the conductor to arcing. The device 26 is structured and placed on the conductor so as to (1) shroud the conductor and function as an arc terminus near the end of the conductor cover and (2) to limit the temperature of the conductor so as to prevent reduction in tensile strength or a significant increase in electrical resistance of the conductor.

Figure 3:
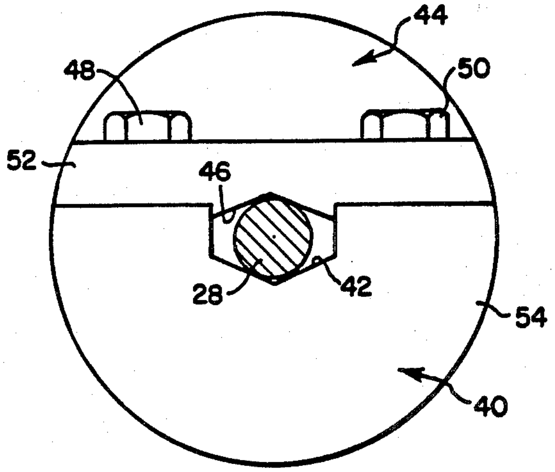
FIG. 3 shows an end view of the arc protection clamp included in the arrangement of FIG. 2A.

As shown in FIGS. 2B and 3, the arc protection clamp 26 includes a lower member 40 which is provided with an inner conductor recess or channel 42 along its length. An upper clamp member 44 is similarly provided with an inner conductor recess or channel 46 along its length.

The clamp 26 is secured to the conductor 28 by means of a pair of bolts 48 and 50 which are tied between respective upper and lower member shoulder portions 52 and 54 on opposite sides of the conductor 28.

Disc portions 56 and 58 of the two clamp members are located on the load side of the clamp 26 because this is the direction toward which the arc is motored. The disc portions 56 and 58 cooperate in the clamped unit to provide an end disc section of the clamp which provides added metallic mass and acts as a barrier in tending to bar further arc travel toward the insulation covering 33.

The upper and lower members 44 and 40 are preferably structured to be held in spaced relation from each other when clamped together by the bolts 48 and 50 thereby helping to avoid weldment of the clamp from arc heat. Thus, a longitudinal gap or slot 60 is provided between the clamp members 40 and 44.

Figure 8A:
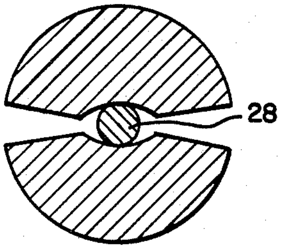
FIG. 8A shows an additional invention embodiment of an arc protection clamp which is provided with a graduated width gap between two separate parts of the clamp and which accommodates a relatively wide range of conductor sizes.
Figure 8B:
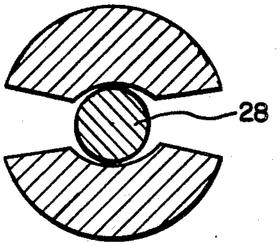
FIG. 8B shows the clamp of FIG. 8A with a larger conductor size.

As shown in FIGS. 8A and 8B, the gap between clamp members can have a graduated width (i.e., wider with distance from the conductor 28). Such tapering permits both type clamps to be designed to accept a greater range of conductor sizes without allowing an arc to run to the conductor or to weld the clamp shut. Thus, if the slot is too wide, the probability is too great that an arc will travel to the conductor within the clamp to produce some burndown. On the other hand, if the gap is too narrow, the arc heat tends to weld the clamp members together.

Figure 16A:
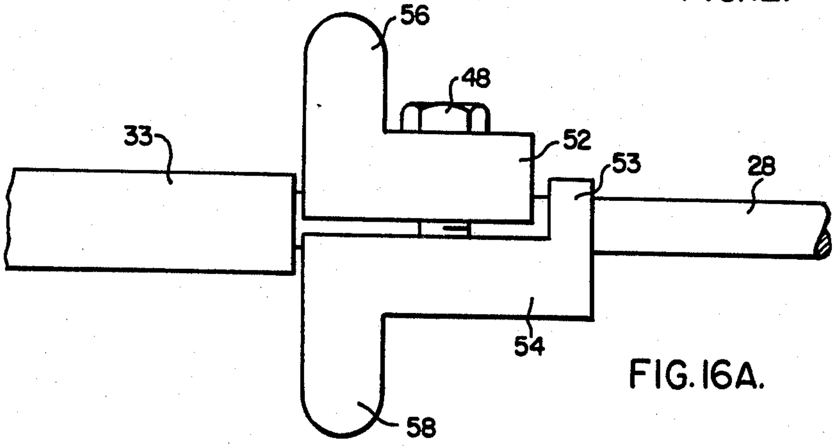
FIGS. 16A and 16B respectively illustrate a clamp having a gap too narrow and a clamp having a gap too wide for proper arc protection.
Figure 16B:
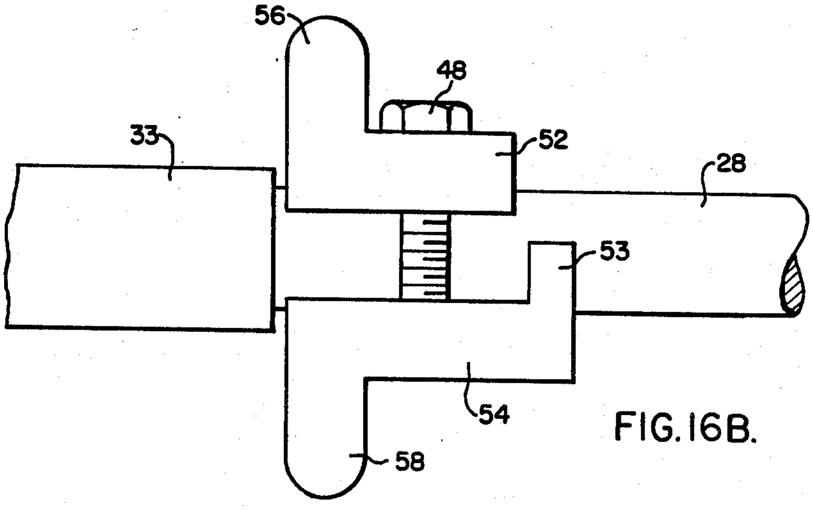

It has been found that gap width should be between ⅛" and ½" for best results. FIG. 16A shows a clamp which is provided with a gap too narrow for the conductor it is used with so that clamp welding can occur. FIG. 16B shows a clamp having a gap too wide for the clamped conductor so that conductor burndown can occur.

Placement of the clamp relative to the insulation covering also affects the allowable gap. In particular, as the clamp is moved closer to the insulation covering, the allowable gap increases. As it is moved further away, the allowable gap decreases because the electric field in the gap gets stronger.

Figure 9:
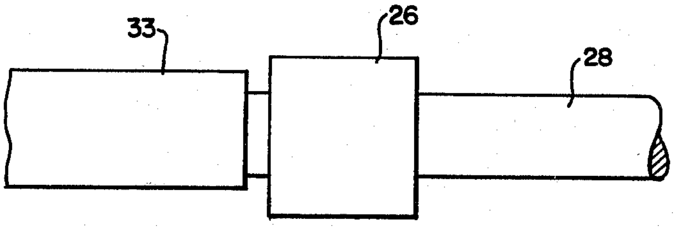
FIG. 9 shows how placement of the clamp on the conductor is limited to assure protection against conductor burndown.

As indicated in FIG. 9, the clamp placement can be varied from an insulation covering overlay position (FIGS. 6, 7) to a point where the clamp end face is spaced a maximum distance from the insulation covering. Preferably, the exposed conductor between the covering and the clamp 26 is 1.5 cm. or less to avoid arc travel over the clamp 26 to any exposed conductor portion. For example, experiments showed that a ½" exposure of conductor will almost certainly lead to arc burndown of the exposed conductor portion.

Preferably, a shield portion 53 of the lower clamp member 54 serves as a splatter shield, i.e., a barrier to molten clamp metal which can be longitudinally projected from the gap 60 during an arc protection operation. Otherwise, metallic particles are undesirably deposited on the upstream insulator tending to short it.

Figure 13:
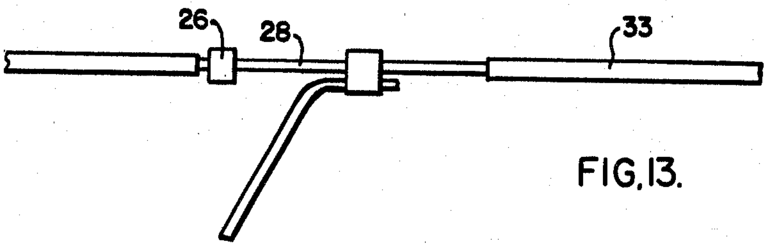
FIGS. 13 and 14 show other dispositions of the clamp on lines in power systems to provide conductor burndown protection.
Figure 14:
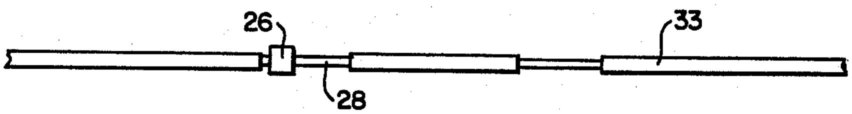

As shown in FIGS. 13 and 14, clamps 26 should be installed at tie connections and splices and other points where the insulation cover is removed so as to provide burndown protection.

Figure 6:
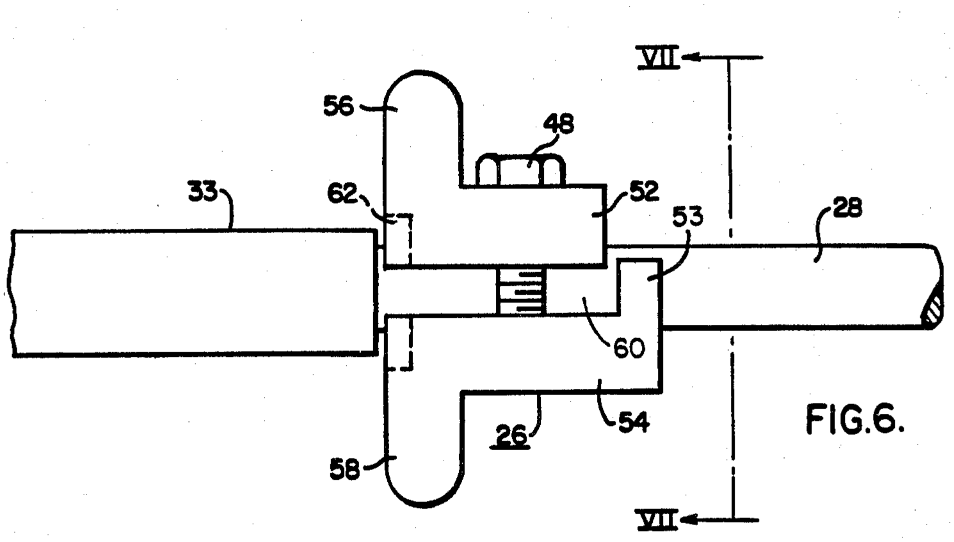
FIG. 6 shows another side elevational view of another invention embodiment of an arc protection clamp in which an end face of the clamp is annularly notched to allow the clamp to cap the free end portion of the insulation covering on the conductor.
Figure 7:
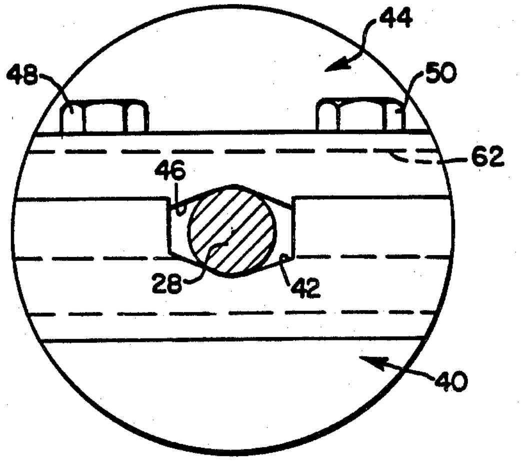
FIG. 7 shows an end view of the arc protection clamp embodiment of FIG. 6, taken along reference line VII—VII of FIG. 6.

As shown in FIGS. 6 and 7, a recess 62 can be provided in the end face of the clamp disc portion on the insulation covering side of the clamp. The recess 62 enables the clamp 26 to be positioned on the conductor 28 with the disc portions 56 and 58 overlaying the insulation covering 33 to provide further assurance against movement of the arm terminus to the exposed end of the insulation covering 33.

Figure 11A:
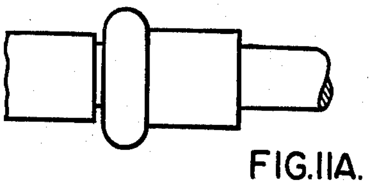
FIG. 11A shows a side elevational view of another embodiment of the invention in which the clamp is secured to the conductor by crimping.
Figure 11B:
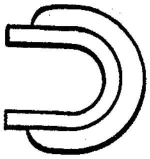
FIG. 11B shows an end view of the FIG. 11A clamp prior to crimping.

It is presently preferred that a removable bolt type of clamp device be employed for burndown protection. An alternative embodiment shown in FIG. 11 is a generally C-shaped crimping type clamp. Thus, portions are crimped together by a suitable tool after the clamp is placed in the desired position along the conductor.

With respect to clamp mass, the minimum mass is determined by the maximum expected fault current and next, if applicable, the minimum practical hardware configuration. Maximum fault currents above 1000 amperes are of primary concern since lower maximum currents generally are unable to sustain an arc for sufficient time to cause conductor burndown. The metal clamp mass provided above the minimum mass value affects the life of the clamp, i.e., the number of arc protection operations it will provide as it loses some metal through meltdown with each arc protection operation.

For a clamp designed for 2 arc operations (i.e., a life expectancy of over 30 years), the first arc operation would result in some metal being removed from the clamp but conductor temperature would not rise enough to anneal the conductor. On the second operation, some further clamp metal would be lost but conductor annealing would still not occur. The third operation would probably result in annealing damage to the conductor. Additional clamp life design normally would not sufficiently increase system reliability enough to justify the added metal mass requirements.

More particularly, the mass of the device must be great enough to limit adequately the temperature rise of the conductor during an arcing fault. A useful parameter is the sensible heat coefficient of the device, defined as the energy input per degree of temperature rise (Joules/°C.).

The device mass is ideally a function of $I^2t$, where I=symmetrical runs fault current and t is the fault duration, because the energy input to the device during a fault is governed by the $I^2R$ losses in the effective contact resistance. Total energy input is $I^2Rt$, were R=effective contact resistance.

The minimum acceptable sensible heat coefficient is a function of the available fault current and the fault duration. The empirically determined minimum acceptable sensible heat coefficient is given by the expression:

$$0.85\times 10^{-6} I^2 t \text{ Joules/°C.}$$

where

Figure 15:
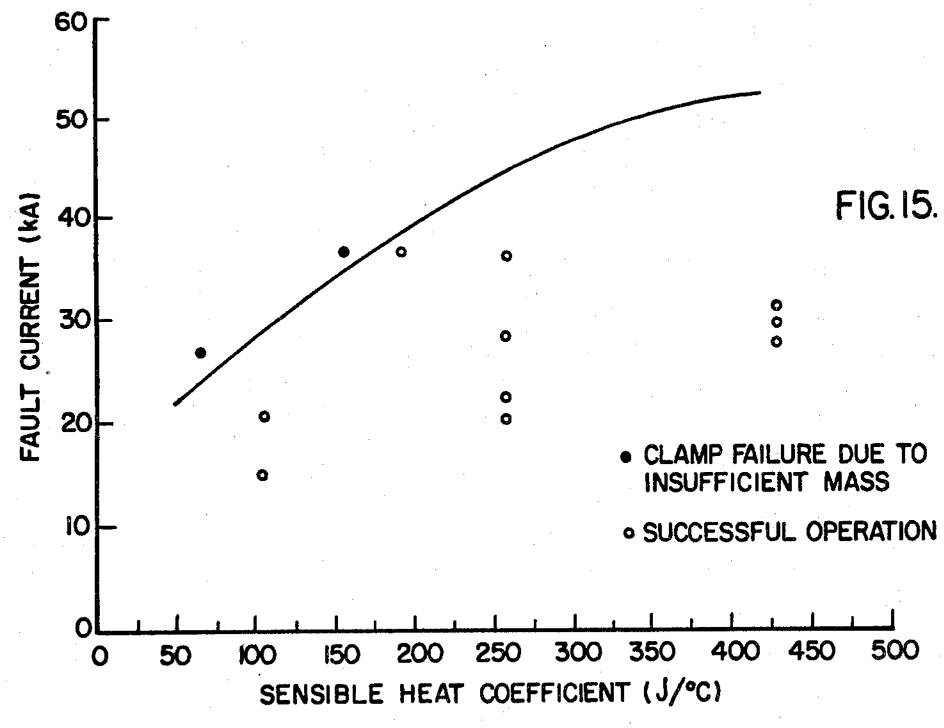
FIG. 15 graphically shows an empirical relationship for a clamp parameter known as the sensible heat coefficient.

I=available symmetrical rms fault current in amperes t=fault duration in seconds Reference is made to FIG. 15 for a graphical representation of this empirical relationship. The sensible heat coefficient is calculated by the following expression:

$$M\times C \text{ Joules/°C.}$$

where

M=total mass of device (Kg)

C=specific heat of device material in Joules/Kg°C.

For aluminum, since the specific heat is 890 J/kg°C., the minimum mass is given by:

$$\text{mass[kg]}=9.6\times 10^{-10} I^2 t$$

Or, in more useful units $$\text{mass [oz]} = \frac{i^2 t}{1770}\; \frac{I\,[\text{kA}]}{t\,[\text{cycles}]}$$

Figure 10:
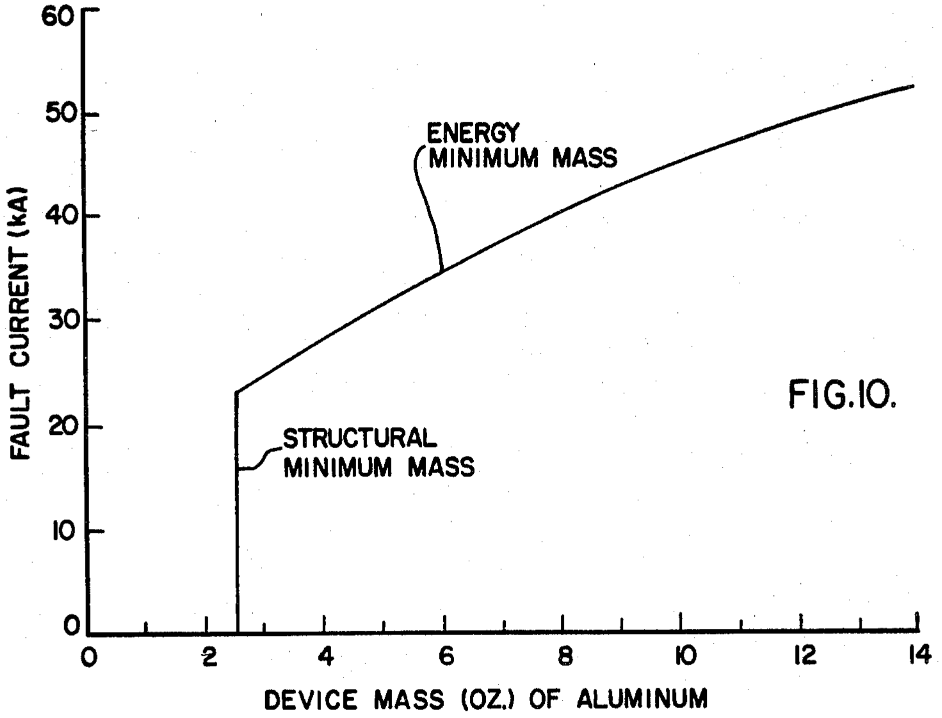
FIG. 10 shows a graph which indicates how the minimum clamp mass needed to provide conductor arc protection varies with the magnitude of fault current.

A practical lower limit exists for the device mass because of structural considerations. For the FIG. 6 embodiment, two aluminum bolts weigh a minimum of 1.1 oz. A minimum of aluminum to surround the conductor is 1.5 oz. FIG. 10 shows the minimum device mass for aluminum construction. Note that for fault currents below 22.6 kA the mass of the device is governed by practical limits rather than the energy input. Above 22.6 kA, the mass design for the device depends on expected sizes of fault currents in the specific use to which the clamp device is to be put. Generally, the structural minimum mass may be up to five times larger than the fault energy minimum mass for some clamp embodiments.

The clamp, under normal conditions, remains idle for many years between operations. It is important to maintain a good electrical connection between the clamp and conductor at all times. Chemical corrosion inhibitors should be used, especially if the clamp and conductor materials are dissimilar. However, it is preferred that the same material be used for the clamp and the conductor, i.e. normally aluminum, to avoid differential thermal expansion and corrosion.

The surface area contact between the conductor and the clamp device must be sufficient to carry fault current. Sufficient area is equal to or greater than the cross-sectional area of the conductor. The clamp further should not stress the conductor such that creep occurs in the conductor. Further, it should be generally smooth with rounded edges to avoid generation of excess electromagnetic radiation due to corona.

The most preferred embodiment of the invention is shown in FIGS. 17A–17G. Thus, a clamp 70 includes irregularly shaped first and second clamp members 72 and 74 which are secured together about a conductor 76 by means of a single bolt 78 with respective clamp member portions hinged together on one side of the conductor 76 as indicated by the reference character 83.

The assembled clamp 70 includes a disc portion 80 which provides a metallic mass that overlays a covering 82 on the conductor 76 as considered in previous description herein. Further, when the clamp is bolted together after placement on the conductor 76, the conductor 76 is tightly held in a groove 77 surrounded by electrical joint compound 79 for good electrical contact with the clamp metal.

Figure 17A:
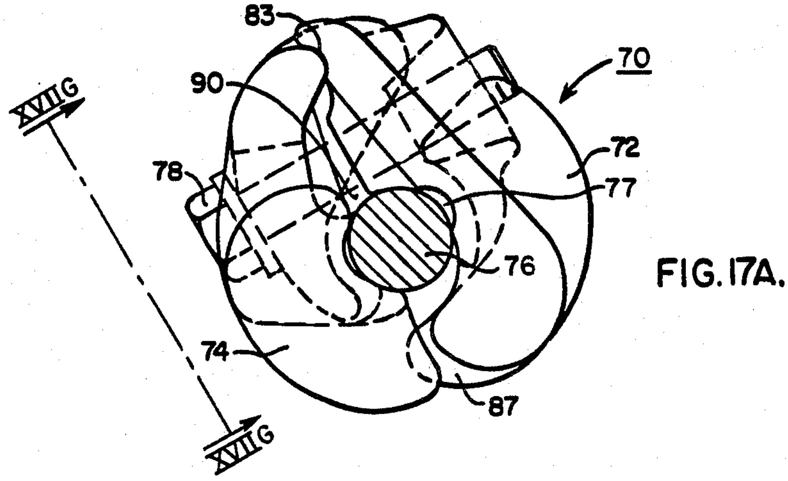
FIG. 17A shows an end view of the preferred clamp embodiment of the invention and it is taken along reference line XVIIA—XVIIA of FIG. 17B.
Figure 17B:
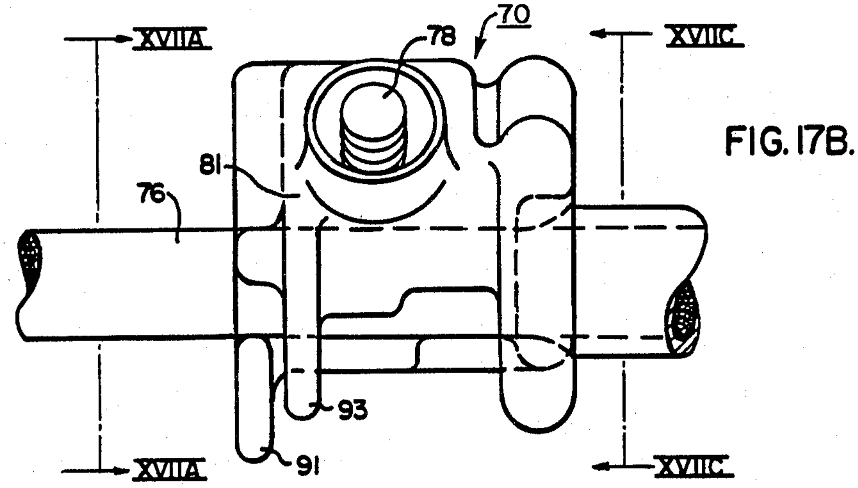
FIG. 17B shows a side elevational view of the clamp of FIG. 17A.
Figure 17C:
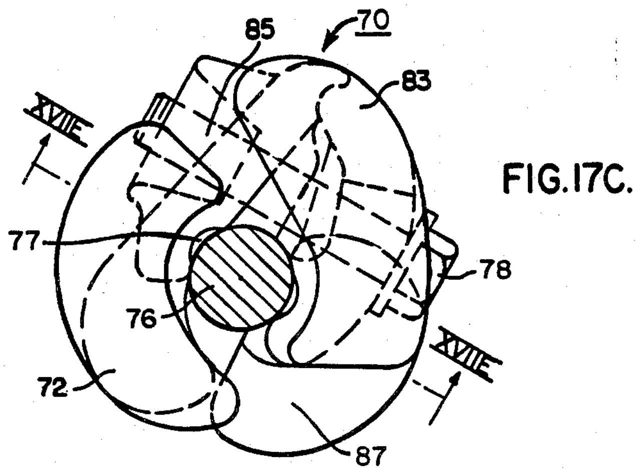
FIG. 17C is an end view opposite to that of FIG. 17A taken along reference line XVIIC—XVIIC of FIG. 17B.
Figure 17D:
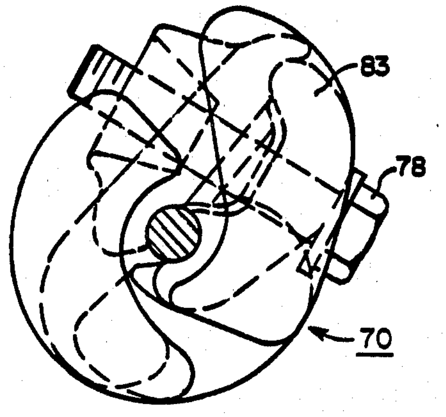
FIG. 17D is a view similar to FIG. 17C with a smaller conductor within the arc protection clamp.
Figure 17E:
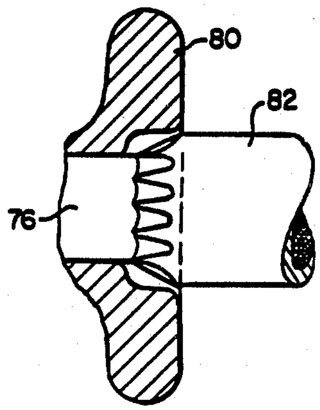
FIG. 17E shows a portion of a section taken along reference line XVIIE—XVIIE of FIG. 17C to show the interface between the arc protection clamp and the insulation covering of the conductor.
Figure 17F:
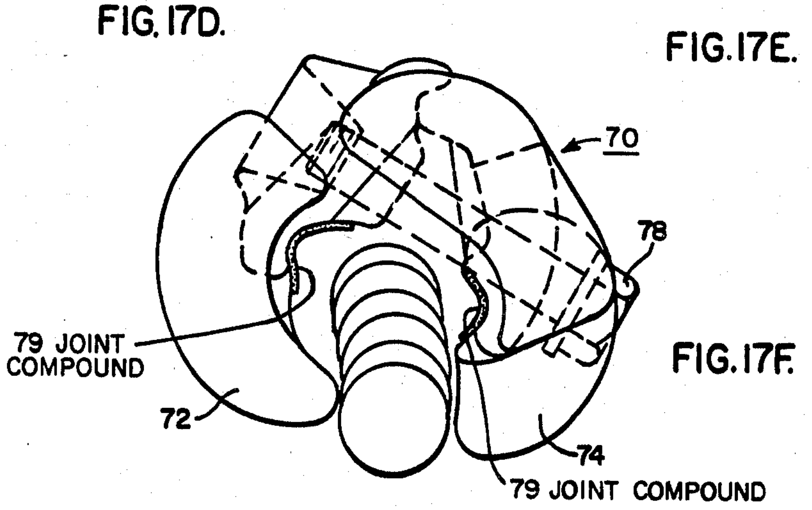
FIG. 17F shows a view like FIG. 17C with the clamp members released from the conductor in an open position.
Figure 17G:
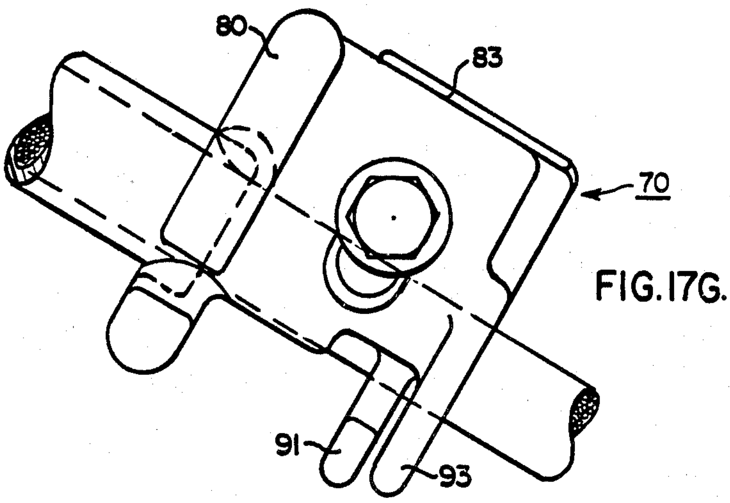
FIG. 17G shows another elevational view of the preferred clamp taken along the reference line XVIIG—XVIIG of FIG. 17A.

As observed in FIG. 17C, a gap exists between the clamp members 72 and 74 between the insulation covering 82 and the bolt 78 on both sides of the conductor 76 as indicated by the reference characters 85 and 87. Generally, the gaps or slots 85, 87 extend along the conductor 76 at an angle to the conductor axis and thus to some extent twist about it. Further, the slots 85, 87 provide a channel that extends generally tangentially to the conductor 76 in the cross conductor direction with an outward taper. Similar comments apply to slot 90 and a continuation of the slot 87 between the clamp members 72 and 74 on the other side of the bolt 78. Clamp portions 91 and 93 serve as splatter shields to obstruct molten clamp metal which is driven along the clamp slot during an arc operation from flying outward against any adjacent support insulator. Having now discussed the improved arc protection clamp in detail, the advantages and features thereof as compared to the cross-referenced prior art arc protection clamp of Shankle et al. can now be seen. The prior art clamp does not have the disc portions 56 and 58 of FIG. 2B, which tend to prevent further arc travel from the clamp toward the insulation covering of the distribution conductor (see for example the insulation covering 33 of FIG. 2B). The prior art clamp also does not have the longitudinal gap or slot 60 shown in FIGS. 2B and 6. The improved arc protection clamp of the present invention incorporates the longitudinal gap or slot 60 to avoid weldment of the upper and lower clamp members 44 and 40 of FIGS. 3 and 7. The present invention, as illustrated in FIG. 2B, includes the splatter shield 53 serving as a barrier to prevent molten clamp metal from being projected from the longitudinal gap or slot 60. The prior art clamp also does not disclose the recess 62 illustrated in FIG. 6. The recess 62 is a novel feature of the present invention that enables positioning of the clamp 26 of FIG. 6 on the conductor such that the disc portions 56 and 58 overlay the insulation covering 33 to provide further assurance against movement of the arc to the exposed end of the insulation covering 33. As illustrated in FIG. 9, realization of the proper placement of the clamp 26 relative to the insulation covering 33 is a significant feature of the present invention. In developing the embodiment of the clamp 26 as disclosed in the instant invention, experimentation revealed the proper distance between the clamp 26 and the insulation covering 33. The significance of this aspect of the present invention was not realized in the prior art clamp. Lastly, the prior art clamp does not disclose the joint compound 79 illustrated in FIG. 17F. The purpose of this compound is to ensure good electrical contact between the clamp 70 and the conductor 76 (see FIGS. 17A and 17F).

What is claimed is:

1. An arrangement for protecting an overhead power distribution line having an insulation cover against damage from fault current arcing, said arrangement comprising a portion of the line having a section of its insulation cover removed to expose a section of the line conductor for interconnection or support, and a conductive clamp device having substantial heat sink mass and secured in conductive contact with said conductor section, said clamp device having at least a portion thereof substantially surrounding and shielding said conductor section to function as an arc terminus, said clamp device arc shielding portion having an enlarged end disc-like portion disposed over said conductor section near or against an end face of adjacent insulation cover.

2. An arrangement as set forth in claim 1 wherein said disc-like end portion is provided with a recess extending axially inwardly from its end face, said clamp device is located on said conductor section so that the adjacent insulation cover extends into said recess with said disc-like end portion overlapping the adjacent insulation cover.

3. An arrangement as set forth in claim 1 wherein said heat sink mass of said clamp device is above a predetermined minimum value based on practical structural factors and wherein the extent to which said heat sink mass is above the minimum practical mass value is based on the fault energy generated by the maximum expected fault current in the use of said clamp device.

4. An arrangement as set forth in claim 1 wherein said clamp device and said conductor section are made from the same material.

5. An arrangement as set forth in claim 1 wherein said clamp device includes two clamp members which form said arc shielding portion when secured together, each of said clamp members having an elongated recess extending inwardly from a surface of one side thereof, and means for removably securing said clamp members together with said conductor section securely located in a conductor channel formed by said clamp member recesses and with said clamp member surfaces spaced from each other by more than a predetermined minimum amount to avoid clamp member weldment and less than a predetermined maximum amount to avoid fault arc travel between said clamp members to said conductor section, said clamp members having respective sections which together form said arc shielding portion which substantially surrounds said conductor section when said clamp members are secured together over said conductor section, said clamp member surfaces being spaced from each other to form a slot between said clamp members on at least one side of the conductor section when said clamp members are secured together thereover, said slot having a width dimension which falls between said predetermined minimum and maximum, so that said clamp device is operative to provide arc protection for a predetermined range of conductor sizes.

6. An arrangement as set forth in claim 5 wherein said clamp device includes means for shielding one end of said slot against generally longitudinally directed molten clamp metal splatter during an arc protective operation.

7. An arrangement as set forth in claim 6 wherein said removable securing means includes bolt means for securing said clamp members together over the conductor section.

8. An arrangement as set forth in claim 5 wherein said slot is provided with a width more than said minimum at its radially inward extent and generally tapers to a greater width less than said maximum at its radially outmost extent.

9. An arrangement for protecting an overhead power distribution line having an insulation covering against damage from fault current arcing, said arrangement comprising a portion of the line having a section of its insulation cover removed to expose a section of the line conductor for interconnection or support, and a conductive clamp device having substantial heat sink mass and secured in conductive contact with said conductor section so as to function as an arc terminus, said clamp device having at least an enlarged arc barrier portion thereof having sufficient mass concentration and substantially surrounding said conductor section to shield the same against the energy of arcs terminated on said arc barrier portions and materially to aid in barring arcs from motoring off said clamp device, said clamp device including two clamp members which form said arc shielding clamp portion when secured together, each of said clamp members having an elongated recess extending inwardly from a surface on one side thereof, and means for removably securing said clamp members together with said conductor section securely located in a conductor channel formed by said clamp member recesses and with said clamp member surfaces spaced from each other by more than a predetermined minimum amount to avoid clamp member weldment and less than a predetermined maximum amount to avoid fault arc travel between said clamp members to said conductor section.

10. An arrangement as set forth in claim 9 wherein an end clamp device portion is provided with a recess extending axially inwardly from its end face, said clamp device is located on said conductor section so that the adjacent insulation cover extends into said clamp device end portion recess with said clamp device end portion overlapping the adjacent insulation cover.

11. An arrangement as set forth in claim 9 wherein said clamp device and said conductor section are made from the same material.

12. An arrangement as set forth in claim 9 wherein said heat sink mass of said clamp device is above a predetermined minimum value based on practical structural factors and wherein the extent to which said heat sink mass is above the minimum practical mass value is based on the fault energy generated by the maximum expected fault current in the use of said clamp device.

13. An arrangement as set forth in claim 12 wherein said clamp device and said conductor section are made from the same material.

14. A conductive clamp device for protecting an overhead power distribution line having an insulation cover against damage from fault current arcing, a portion of the line having a section of its insulation cover removed to expose a section of the line conductor for interconnection or support, said device comprising a pair of clamp members having substantial heat sink mass to function as an arc terminus and each having an elongated recess extending inwardly from a surface on one side thereof, and means for removably securing said clamp members together so that said conductor section can be securely located in a conductor channel formed by said clamp member recesses with said clamp member surfaces spaced from each other by more than a predetermined minimum amount to avoid clamp member weldment and less than a predetermined maximum amount to avoid fault arc travel between said clamp members to said conductor section, said clamp members having respective sections which together form an enlarged arc barrier portion which substantially surrounds said conductor section when said clamp members are secured together over said conductor section to shield the same against the energy of arcs terminated on said arc terminus portion and materially to aid in barring arcs from motoring off said clamp device, wherein an end clamp portion of said conductive clamp device is provided with a recess extending axially inwardly from its end face so that when said clamp device is located on said conductor section, the adjacent insulation cover extends into said end portion recess with said clamp device end portion overlapping the adjacent insulation cover.

15. A conductive clamp device as set forth in claim 14 wherein said clamp device includes means for shielding against generally longitudinally directed molten clamp metal splatter during an arc protection operation.

* * * * *